United States Patent [19]

Kinsora

[11] Patent Number: 4,946,327

[45] Date of Patent: Aug. 7, 1990

[54] FILM CARRIAGE ASSEMBLY AND METHOD FOR MOVING AND STORING A FILM PLATTER

[76] Inventor: Samuel Kinsora, 27200 Ursuline, St. Claire Shores, Mich. 48081

[21] Appl. No.: 323,292

[22] Filed: Mar. 14, 1989

[51] Int. Cl.⁵ ............................................. B65G 1/00
[52] U.S. Cl. .................................... 414/331; 414/786; 414/277; 414/282
[58] Field of Search ............... 414/331, 277, 279, 280, 414/281, 282, 283, 495, 501, 609, 660, 661, 664, 669, 671, 672, 786; 198/468.8

[56] References Cited

U.S. PATENT DOCUMENTS

| | | | |
|---|---|---|---|
| 2,806,619 | 9/1957 | Schroeder | 414/669 |
| 3,896,941 | 7/1975 | Kuhn et al. | 414/277 X |
| 3,977,542 | 8/1976 | Stolzer | 414/281 X |
| 4,405,277 | 9/1983 | Burkner et al. | 414/277 X |
| 4,558,983 | 12/1985 | Freeman et al. | 414/331 |
| 4,591,044 | 5/1987 | Ogami et al. | 198/468.8 X |

FOREIGN PATENT DOCUMENTS

| | | | |
|---|---|---|---|
| 2411415 | 9/1975 | Fed. Rep. of Germany | 414/281 |
| 3231006 | 2/1984 | Fed. Rep. of Germany | 414/672 |
| 0625587 | 9/1961 | Italy | 414/660 |
| 0009847 | 1/1987 | Japan | 414/280 |

Primary Examiner—David A. Bucci
Assistant Examiner—James R. Bidwell
Attorney, Agent, or Firm—John C. Evans

[57] ABSTRACT

A film carriage assembly for supporting a film platter in a secured manner including a housing, a surface supported by the housing and adapted to support a film platter thereon with the surface being rotatable to any position between a substantially horizontal position and a substantially vertical position and with the film platter being disposed securely on the surface such that it is prevented from movement relative to the surface when the surface is rotated to any position between a substantially horizontal position and a substantially vertical position.

26 Claims, 5 Drawing Sheets

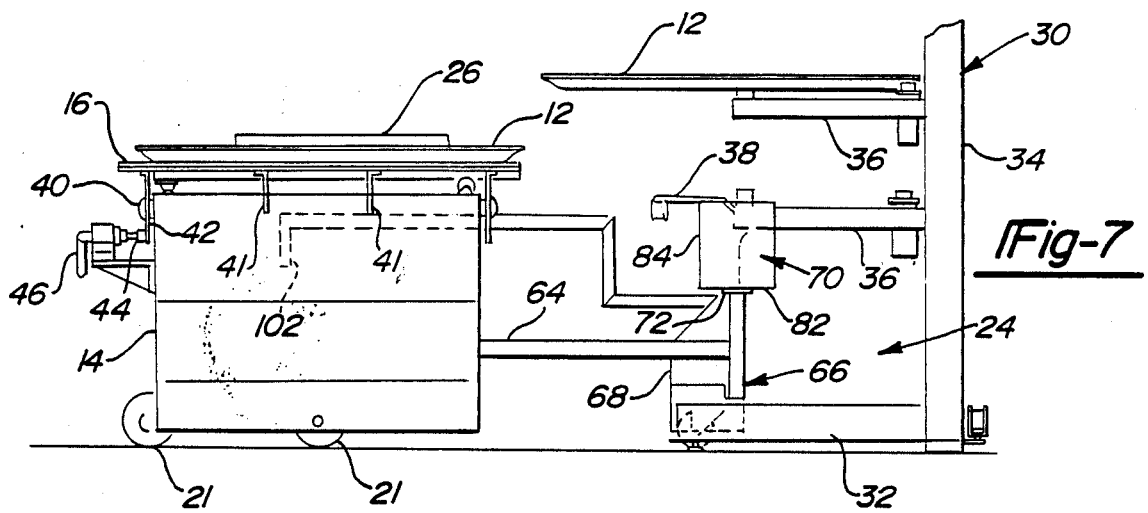
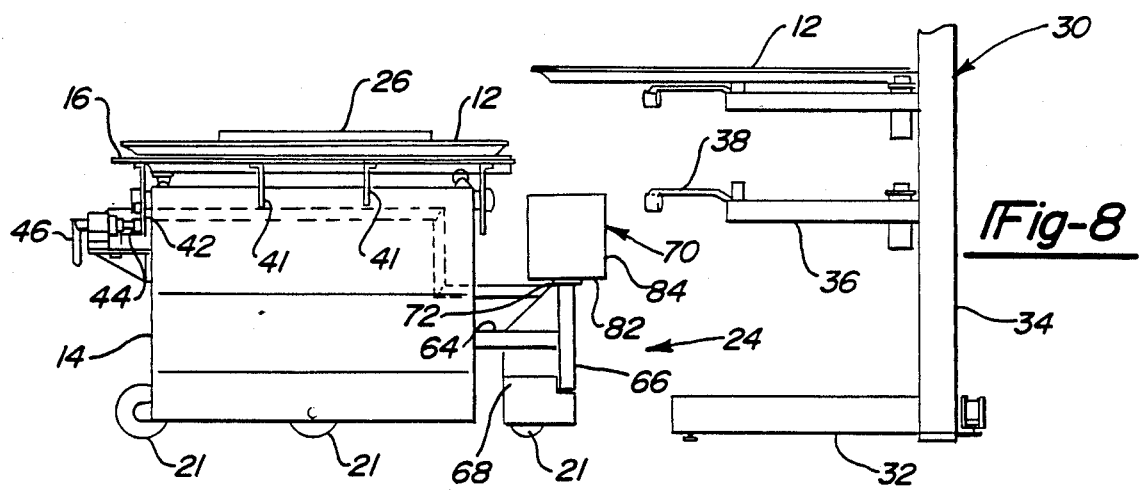
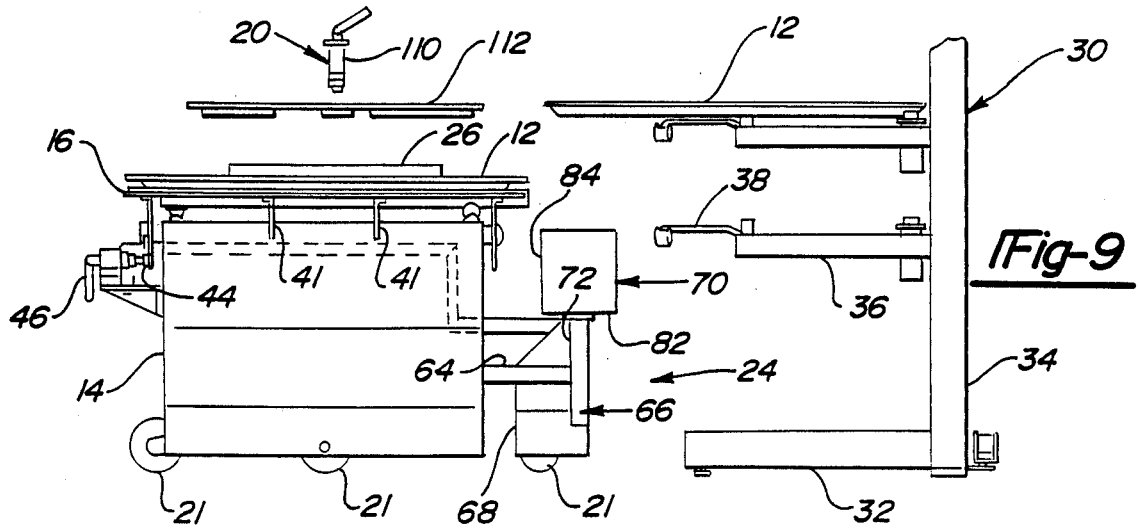

FILM CARRIAGE ASSEMBLY AND METHOD FOR MOVING AND STORING A FILM PLATTER

BACKGROUND OF THE INVENTION

(1) Technical Field

The invention relates to a film carriage assembly and method for moving a film platter in a safe and secure manner from a projection table to the assembly and between projection tables in a movie theatre.

(2) Description of the Prior Art

The trend in the movie theatre industry today is to build theaters which typically include eight or more individual screens or "houses" of varying capacity to give the movie going public a wider selection from which to choose. But there are other economic reasons for this trend. Movies which start out being very popular may wain with time. With multi-house theaters, these less popular movies can be moved from the larger houses to ones with smaller capacity. In this way, the "houses" with the largest capacity can be utilized to show the movies with the greatest popularity at any given time and thus efficiently use all of the houses in the theater. By careful shifting of the movies between the houses with varying capacity, movie theater owners can literally pack the theater.

The projection room in these modern multi-house theaters typically consists of a long relatively narrow corridor spanning all the individual houses and which is often crowded with equipment. For example, each house includes a projector and a projection table disposed remote from the projector and upon which is supported a film platter. The film platters are typically 52 ½ inches in diameter upon which are supported six thousand feet of film. The film is wound about a film ring on the platter. During the showing of a movie, the film runs from the platter to the projector and then back to another platter which is also supported by the projection table as is commonly known in the art.

Presently in the prior art, when the film is to be moved from one house to another, the film is securely clamped to the ring and the film ring along with the film is slid off the platter and carried to another projection table located at the designated house. This can be a very tricky job and usually requires the careful attention of two professional projectionist. Even then, it is not uncommon that the film is dropped during transit. When this occurs, the clamps usually release and because of the nature of the material, the film becomes hopelessly entangled, knotted, broken and ultimately ruined. Each film can cost in excess of six thousand dollars and when dropped the show is literally over.

Still another trend in the industry is that professional projectionist are being phased out in an effort to cut costs. In their place, unskilled ushers and managers will run the projectors and ultimately move the film from house to house. This inevitably will result in more damage to film due to accidents in transit between the houses.

The subject invention solves these problems by including a film carriage assembly and method for moving and storing a film platter which may be operated by only one person and which significantly reduces the possibilities for damaging the film in any manner.

SUMMARY OF THE INVENTION AND ADVANTAGES

The subject invention is directed toward a film carriage assembly for supporting a film platter in a secured manner including a housing and a surface supported by the housing. The surface is specifically adapted to support a film platter thereon. The assembly further includes means for rotating the surface to any position between a substantially horizontal position and a substantially vertical position and means for preventing movement of the film platter relative to the surface when the surface is rotated to any of these positions. The invention is also directed toward method of transferring a film platter from a projection table to the film carriage assembly in a secured manner including the steps of indexing the film platter with an indexing means from a position on the projection table to a predetermined second position raised from the projection table and then transferring the film platter from the indexing means to a transfer means. The transfer means is employed for transferring the film platter from the transfer means to the surface on the film carriage assembly.

Accordingly, the subject invention overcomes the problems of the prior art by including a method whereby a single operator may securely transfer a film platter upon which a film is disposed from a projection table to a film carriage assembly in a secure and efficient manner which significantly reduces the possibility of damaging the film. The subject invention overcomes other problems in the prior art by including a film carriage which is specifically adapted to move and store a film platter in a secure manner and which includes a surface which is rotatable from a horizontal position to a substantially vertical position thus reducing the profile of the film carriage and making it easier for the operator to maneuver the film carriage and thus the film platter from one house to another along the corridor of a projection room.

BRIEF DESCRIPTION OF THE DRAWINGS

Other advantages of the present invention will become readily appreciated as the same becomes better understood by reference to the following detailed description when considered in connection with the accompanying drawings wherein:

FIG. 7 is a side view of the film carriage assembly with the film platter disposed on the surface of the film carriage assembly and the indexing means disposed in the extended position;

FIG. 8 is a side view of the film carriage assembly with the film platter disposed on the surface of the film carriage assembly and the transfer means disposed in the retracted position;

FIG. 9 is a side view of the film carriage assembly illustrating the means for preventing movement of the film platter relative to the surface of the film carriage assembly;

DESCRIPTION OF THE PREFERRED EMBODIMENT

Figure 1:
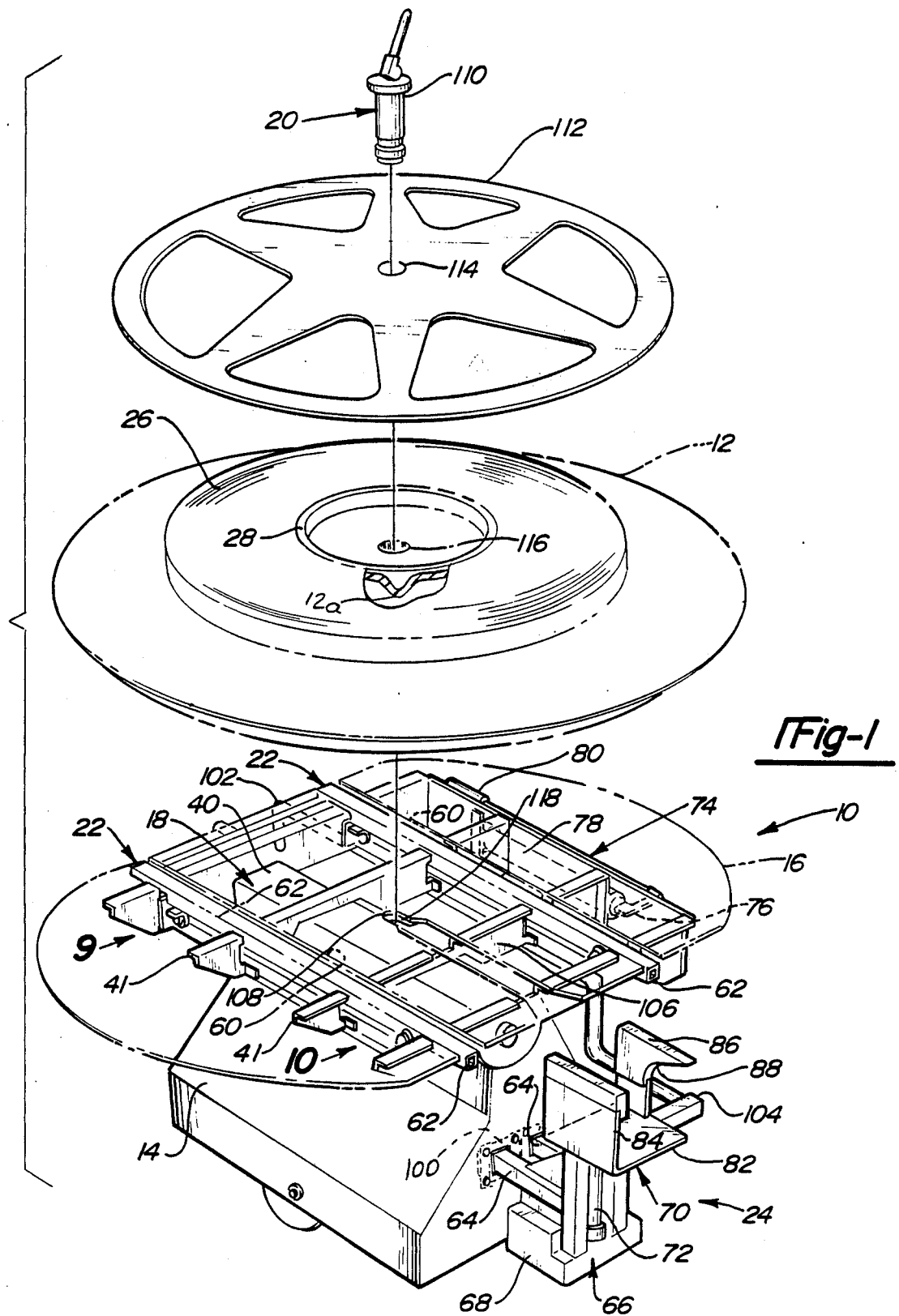
FIG. 1 is a perspective view of the film carriage assembly.
Figure 2:
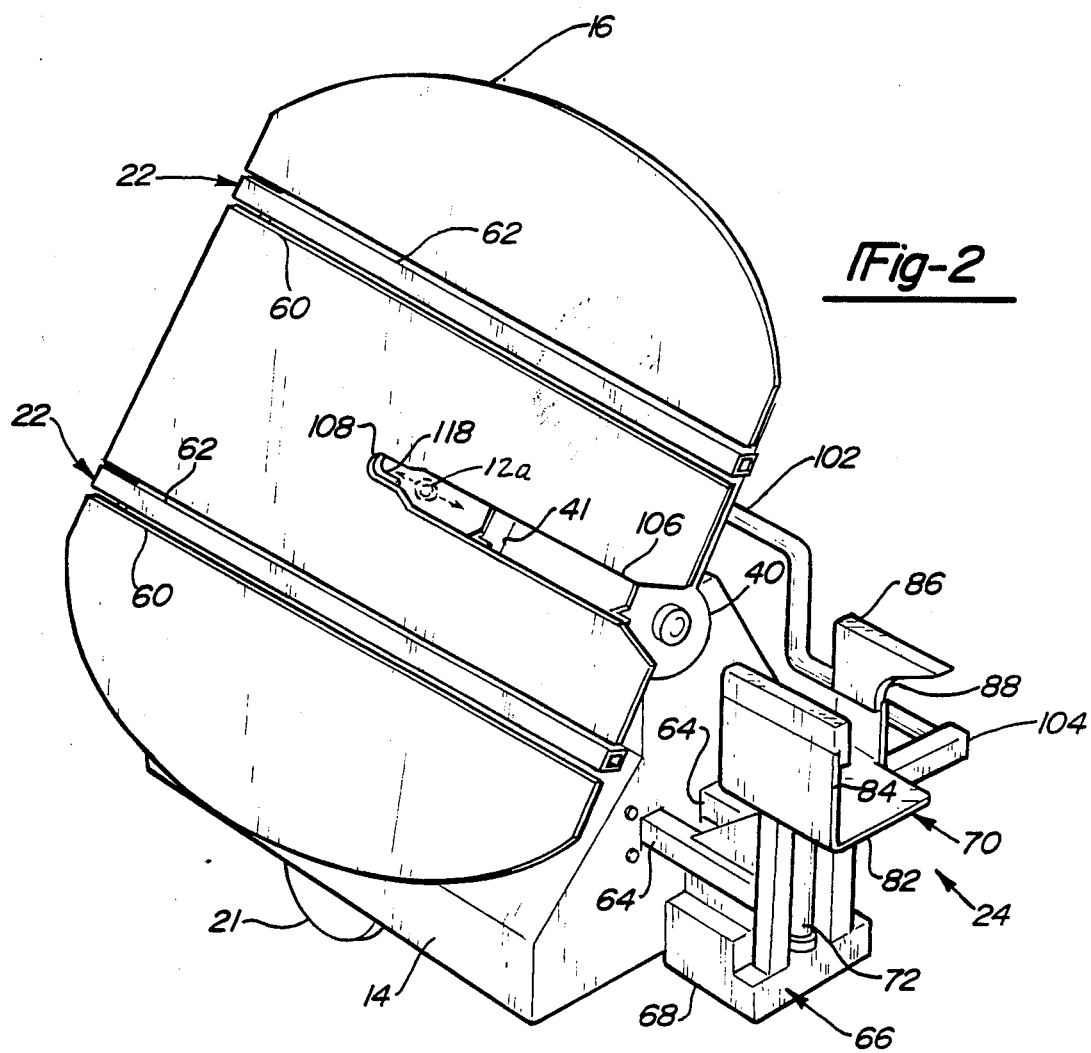
FIG. 2 is a perspective view of the film carriage assembly with the surface rotated to a substantially vertical position.

A carriage assembly for moving and storing an object 12 is generally shown at 10 in FIGS. 1 and 2. The carriage assembly 10 includes a housing 14 and a surface 16 supported by the housing 14 and specifically adapted to support the object 12 thereon. The assembly further includes means, generally indicated at 18 for rotating the surface 16 to any position between a substantially horizontal position and a substantially vertical position. Means, generally indicated at 20, is included for preventing movement of the object 12 relative to the surface 16 when the surface 16 is rotated to any position. The assembly further includes indexing means, generally shown at 24, supported by the housing 14 and moveable between a retracted position and an extended position with respect to the housing 14 for indexing the object 12 from one position to a predetermined second position. Further, the assembly 10 includes a transfer means, generally indicated at 22, which is moveable between a retraced position and an extended position with respect to the surface 16 and adapted to moveably support the object 12. The transfer means 22 is operative to transfer the object 12 from the surface 16 to the indexing means 24 and to transfer the object 12 from the indexing means 24 to the surface 16 when the object 12 has been indexed to the predetermined second position.

The subject invention is specifically directed toward a film carriage assembly 10 wherein the object is a film platter 12 with a reel of film 26 wound about a film ring 28 disposed on the platter 12. The film platter 12 is also specifically adapted to be supported upon a projection table, generally indicated at 30 in FIGS. 4-10. The projection tables 30 are disposed adjacent the projectors in the projection room. The projection table 30 includes at least one bottom leg 32 and a vertical support 34 extending upwardly from the leg 32. The table 30 further includes platter support arms 36 extending horizontally outward from the vertical support 34 for supporting the platter 12 and a tensioning arm 38 operatively connected to the platter support arm 36 on the underside thereof for applying a predetermined tension to the film as the film is run either to or from a projector. The projection table 30 rotatably supports the film platter 12 and facilitates the delivery of the film from a film platter 12 to a projector and then from the projector back to the platter 12. Said another way, the film is taken off one rotating platter 12, directed through the projector which projects an image onto the theatre screen and then directed from the projector back to a second rotating platter 12 which is disposed on another of the platter support arms 36 and wound about the film ring 28 as is commonly known in the art.

The housing 14 is moveably supported by wheels 21 or the like and is adapted for rolling engagement with a surface for facilitating the moving of a film platter 12 from one projection table 30 to another in a projection room. It should be noted, however, that the housing 14 can be of any configuration which is adapted to rotatably support the surface 16.

The means 18 for rotating the surface 16 is disposed between the surface 16 and the housing 14 and includes an elongated portion 40 extending along an axis of the surface 16. The elongated portion 40 is rotatably supported about its longitudinal axis on the housing 14, and includes a driven gear 42 disposed at one end thereof. A drive gear 44 mounted on the housing 14 is disposed to operatively mesh with the driven gear 42 to rotate the elongated portion 40 so as rotate the surface 16 to any position between a substantially horizontal and substantially vertical position. The drive gear 44 is in turn driven by a hand crank 46. However, it should be noted, that the surface 16 may be rotated by any means, whether manual or automatic, such as by an electric motor or the like.

Cross members 41 are disposed transverse to the elongated portion 40 and between the surface 16 and the elongated portion 40 to interconnect the surface 16 and the elongated portion 40 and to provide support for the surface 16 of the carriage assembly 10.

Figure 3:
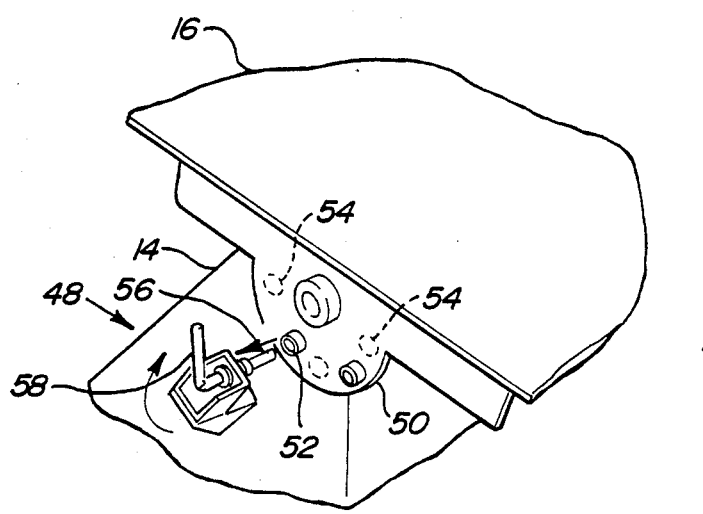
FIG. 3 is a partially broken away perspective view of the surface locking means.

Referring now to FIG. 3 there is disclosed a surface locking means, generally indicated at 48, for locking the surface 16 at any position between a substantially horizontal position and a substantially vertical position. The surface locking means 48 includes a downwardly extending flange 50 disposed on one side of the surface 16. The flange 50 includes at least one aperture 52 and the housing 14 includes a plurality of corresponding apertures 54 disposed adjacent the flange 50. The surface locking means 48 further includes a pin 56 adapted to be disposed through the aperture 52 on the flange 50 and through any one of the plurality of corresponding apertures 54 on the housing 14 to lock the surface 16 in any one position between the substantially horizontal and substantially vertical position. The pin 56 may be a compression fastener including a lever 58 such that once the pin is inserted through the apertures 52, 54 and the lever moved from one position to another, the pin 56 will become locked in place such that it can not be pulled out until the lever is moved back to the original position. However, the surface locking means 48 may include any mechanism which will lock the surface 16 at any position between a substantially horizontal position and a substantially vertical position.

Figure 11:
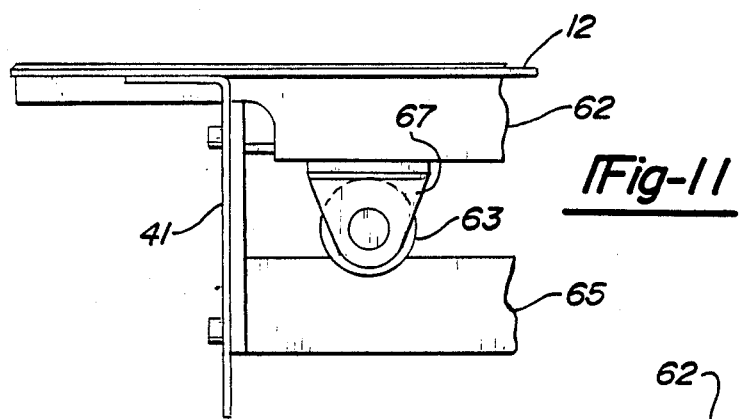
FIG. 11 is a partially broken away cross-sectional side view of the roller bearings of the transfer means.
Figure 12:
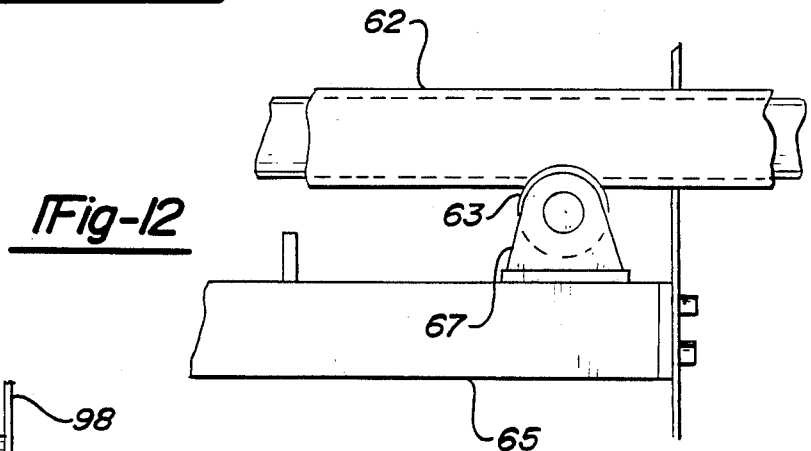
FIG. 12 is a partially broken away cross-sectional side view of the roller bearings of the transfer means.

The surface 16 of the carriage assembly 10 defines a plane and includes two recessed portions 60 disposed within the surface 16 of the carriage assembly 10. The transfer means 22 includes two rods 62 which are slideably disposed within the recess 60 and parallel with the plane defined by the surface 16 and moveable between retracted and extended positions with respect to the surface 16 for movably supporting and operative to transfer the film platter 12 from the indexing means 24 to the surface 16 and from the surface 1 to the indexing means 24. The rods 62 of the subject invention are adapted to be manually moved between the retracted and extended positions. To this end, the transfer means 22 includes roller bearings 63 disposed on the underside of the rods 62 and in rolling engagement with guide members 65 as shown in FIGS. 11 and 12. The roller bearings 63 are operatively connected to flanges 67 which in turn are fixedly mounted to rods 62 as shown in FIG. 11. Alternatively, however, the roller bearings 63 and thus the flanges 67 may be fixedly mounted to the guide member 65 as shown in FIG. 12. However, it should be noted that the rods 62 may be moved by any other means.

The indexing means 24 includes at least one support arm 64 which is slideably supported within the housing 14 and moveable between a retracted position and an extended position with respect to the housing 14. More specifically, the indexing means 24 of the preferred embodiment includes two support arms 64 for supporting a jack means, generally indicated at 66 disposed at the distal end of the support arm 64 for indexing the film platter 12 from one position to a predetermined second position. The jack means 66 includes a base support portion 68, a U-shaped collar, generally indicated at 70, and a hydraulic cylinder 72 disposed between the base support portion 68 and the collar 70. The hydraulic cylinder 72 is of the conventional type including a piston disposed therein with a rod moveable between a retracted position within the cylinder 72 and an extended position out of the cylinder 72 for moving the collar 70 into engagement with the film platter 12 to move the film platter 12 from one position to the predetermined second position. The hydraulic cylinder 72 is actuated by means of a hydraulic pump generally indicated at 74. Hydraulic lines (not shown) provide fluid communication between the cylinder 72 and the pump 74. The pump 74 includes a lever 76 operatively connected to a piston (not shown) within the cylinder 78. A handle 80 actuates the lever 76 and thus the piston within the cylinder 78 to pump fluid to the hydraulic cylinder 72 to move the piston and rod disposed within the cylinder 72 between extended and retracted positions with respect to the cylinder. In this way, the collar 70 may be raised and lowered.

The U-shaped collar 70 includes a horizontal base portion 82 and first and second arms 84, 86 which extend upwardly from the base portion 82. The second arm 86 includes a recessed portion 88 for receiving the tensioning arm 38 which is disposed on the underside of the platter support arm 36 of the projection table 30 when the collar 70 is disposed for indexing the film platter 12 from one position on the platter support arm 36 to the predetermined second position.

Figure 13:
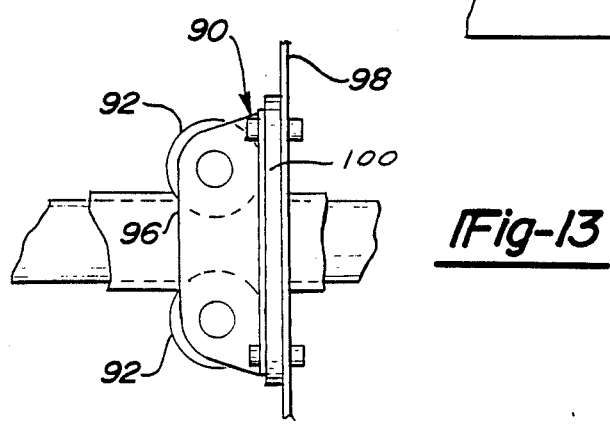
FIG. 13 is a partially broken away cross-sectional side view of the support arm stabilizers of the indexing means.

The indexing means 24 also includes support arm stabilizers, generally indicated at 90, as shown in FIG. 13. The stabilizers 90 include rollers 92 generally disposed on opposite sides of the support arm 64 and in rolling engagement therewith. The stabilizers 90 provide support for the support arm 64 as they move between the extended and retracted positions with respect to the housing 14. The rollers 92 are operatively connected to flanges 96 which in turn are fixedly mounted to any structure of the housing such as a side wall 98 or structural beam 100.

The indexing means 24 further includes an indexing handle 102 for moving the indexing means 24 between the retracted and extended positions with respect to the housing 14. More specifically, the indexing handle 102 is operatively connected to a flange 104 extending horizontally from the jack means 66 and is used to position the jack means 66 beneath the film platter 12 in preparation for indexing the platter 12 when the U-shaped collar 70 is moved into engagement with the platter 12 by the hydraulic cylinder 72.

The film platters 12 which are used in the industry include a tit 12a shown in broken outline in FIGS. 1 and 2 on the underside thereof for disposition in a corresponding depression on the platter support arm 36 of the projection table 30. Through this arrangement, the platter 12 is specifically adapted to rotate upon the platter support arm 36 so that the film may be run from the platter 12 to the projector and vice versa. The surface 16 includes means 106 for receiving the tit when the plater 12 is transferred to the surface 16. The means 106 for receiving the tit include a slot 106 disposed on the surface 16. The slot 106 extends inwardly on the surface 16 and includes a receptor 108 disposed near the middle of the surface 16 for receiving the tit on the platter 12. In this way, a platter 12 may be indexed from one position on the platter support arm 36 by the indexing means 24 to a second predetermined position and then transferred to the transfer means 22 when the transfer means 22 is in the extended position. When the transfer means 22 is then moved to the retracted position within the recesses 60 in the surface 16, the slot 106 on the surface 16 is particularly adapted for smoothly receiving the tit on the underside of the plater 12 and facilitates the smooth transfer of the platter 12 to the surface 16.

The platter locking means 20 for preventing movement of the film platter 12 relative to the surface 16 when the surface 16 is rotated to any position may be of any construction calculated to inhibit movement of the platter. However, the means 20 of the preferred embodiment may include a cam lock fastener 110 and a guard 112. The cam look fastener 110 is adapted to be disposed through an aperture 114 in the guard 112 and then through an aperture 116 in the platter 12, through the tit on the underside of the platter 12 and into engagement with a flange 118 disposed adjacent the receptor 108 on the surface 16. The lever 120 on the cam lock fastener 110 is then rotated downwardly which expands the distal end of the fastener outwardly into engagement with the flange 118 adjacent the receptor 108 on the surface 16. In this way, the film platter 12 is locked to the surface 16 and is prevented from relative movement with respect to the surface 16 when the surface 16 is rotated to any position between a substantially horizontal position and a substantially vertical position to reduce the profile of the film carriage assembly 10 and to facilitate moving the film platter 12 in the cramped quarters of the projection room.

Figure 4:
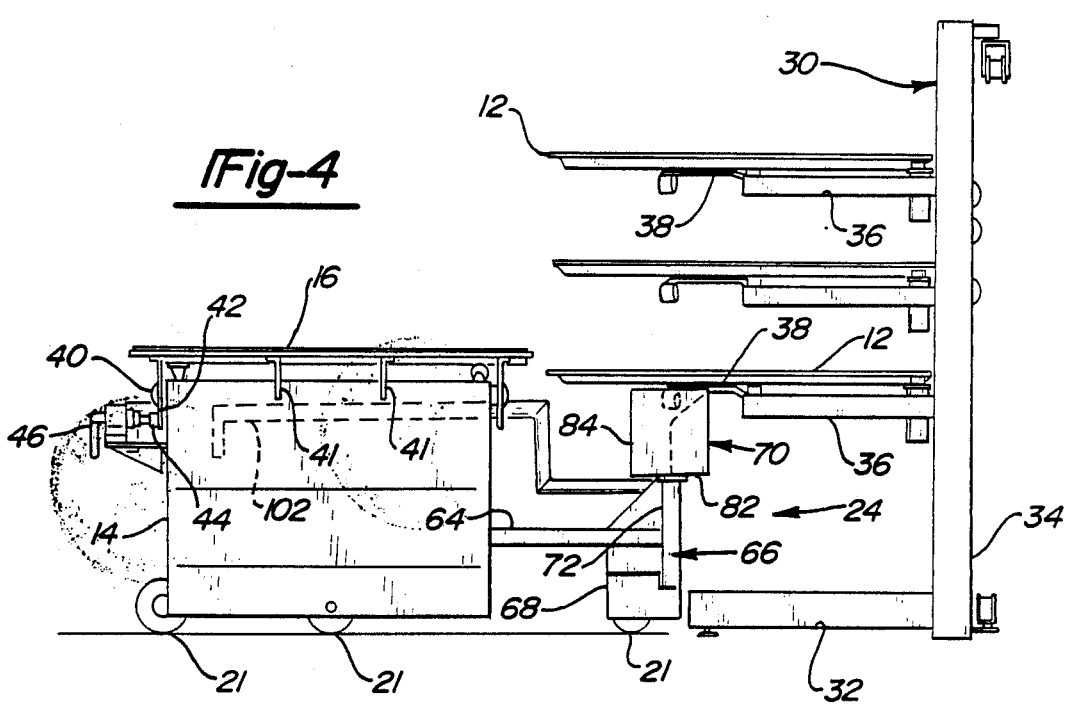
FIG. 4 is a side view the film carriage assembly with the indexing means disposed in the extended position with respect to the housing.
Figure 5:
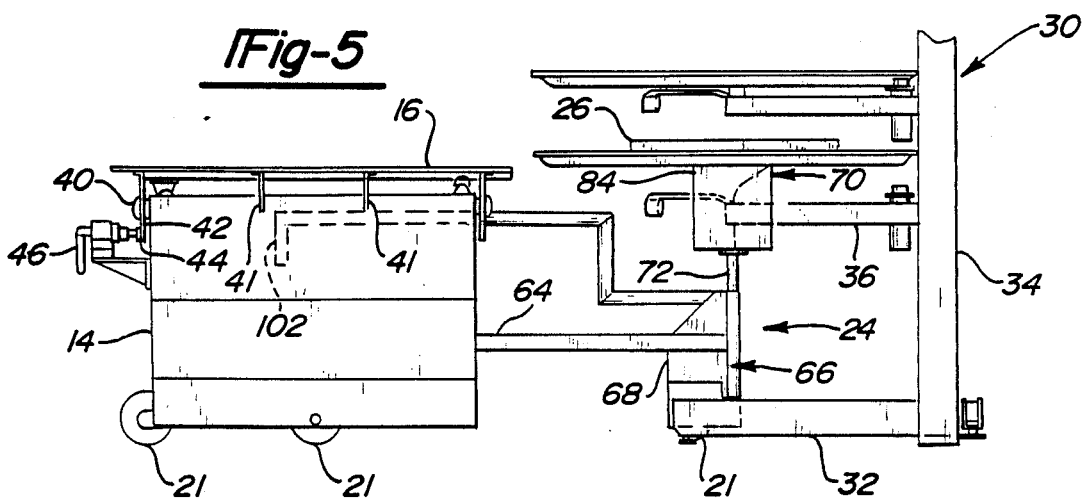
FIG. 5 is a side view of the film carriage assembly with the film platter indexed from one position on the projection table to a predetermined second position.
Figure 6:
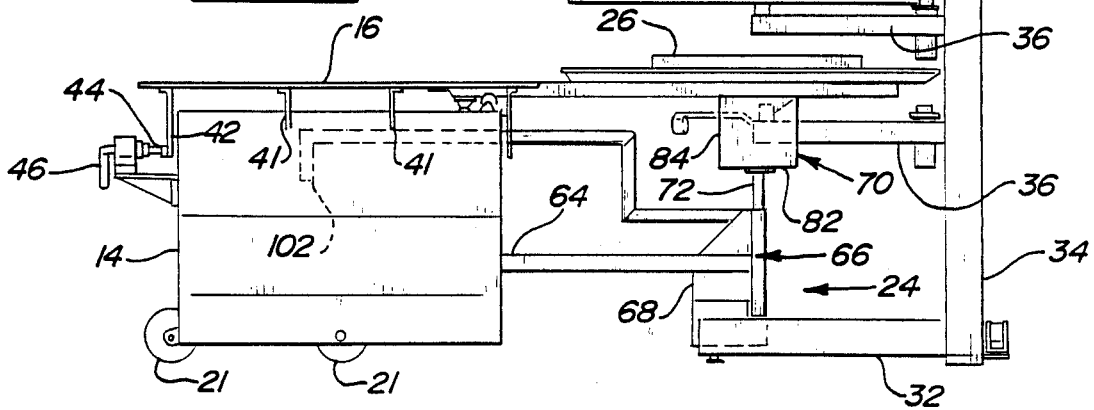
FIG. 6 is a side view of the film carriage assembly with the film platter disposed on the transfer means which is in the extended position with respect to the surface of the film carriage assembly.
Figure 10:
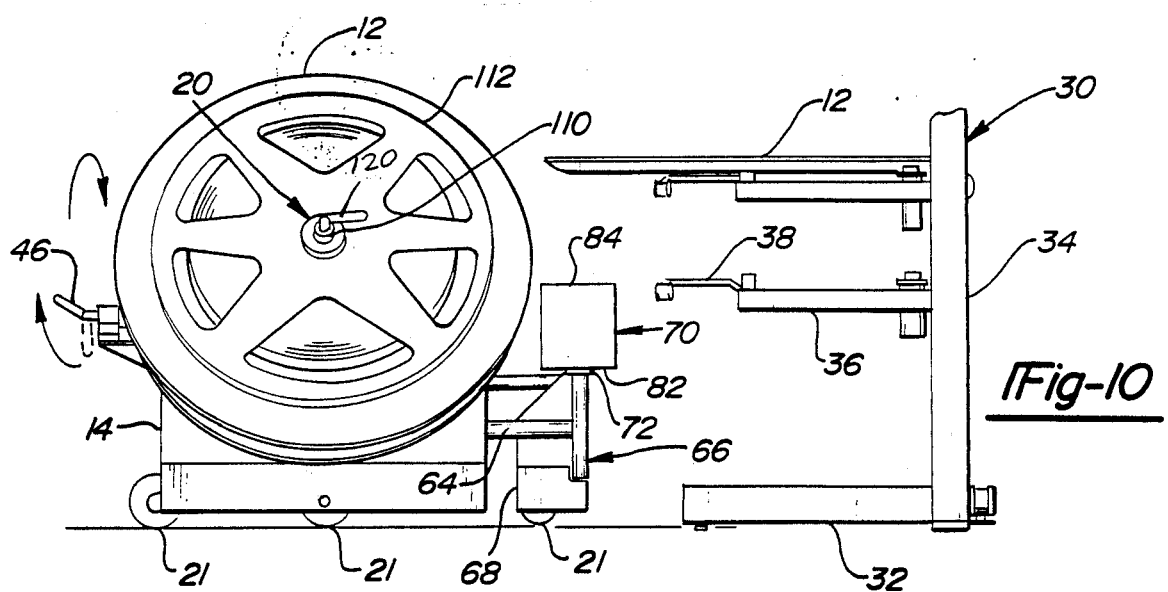
FIG. 10 is a side view of the film carriage assembly with the surface rotated to a substantially vertical position.

The subject invention is also directed toward a method of transferring the film platter from the projection table 30 to the film cart assembly 10 in a secured manner. This method includes the steps of indexing the film platter with an indexing means 24 from one position on the projection table 30 to a predetermined second position raised from the projection table, transferring the film platter 12 from the indexing means 24 to the transfer means 22 and transferring the film platter 12 from the transfer means 22 to the surface 16 on the film carriage assembly 10. The platter 12 is then locked against relative movement with respect to the surface 16 of the film carriage assembly 10. Once locked, the surface 16 of the film carriage 10 may be rotated to any position between a substantially horizontal and a substantially vertical position. More specifically, the step of indexing the film is further characterized by moving the indexing means 24 to the extended position away from the film carriage assembly 10 and beneath the film platter 12 disposed on the platter support arm 36 of the projection table 30. This is achieved by moving the indexing handle 102 from a first position to an extended position as shown in FIGS. 4 and 5. This moves the support arms 64 and thus the jack means 66 from the retracted position to the extended position with respect to the housing 14. The collar 70 on the indexing means 24 is then raised upwardly by means of the hydraulic cylinder 72 into engagement with the platter 12 to index the platter 12 from one position on the platter support arm 36 of the projection table 32 to the predetermined second position.

The method of transferring the film platter 12 from the indexing means 24 to the transfer means 22 is further characterized by moving the transfer means 22 to an extended position away from the surface 16 of the film carriage assembly 10 and beneath the film platter 12 when it is disposed at the predetermined second position. More specifically, the two rods 62 are slideably moved from the retracted to the extended position with respect to the surface 16 and positioned beneath the platter 12 when it is disposed in the second position. The collar 70 is then lowered by means of the hydraulic cylinder 72 which in turn places the platter 12 on the two rods 62 of the platter transfer means 22. The rods 62 are then moved from the extended position to the retracted position within the recessed portion 60 of the surface 16 and parallel to the plane defined by the surface 60 so that the platter is supported by the surface 16 on the film carriage assembly.

Using the above described method in conjunction with the film carriage assembly 10 provides a safe, cost effective and secure manner of moving the expensive film between projection tables 30 in the cramped quarters of a projection room in a movie theater.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A carriage assembly for moving and storing an object comprising:
   a housing;
   a surface supported by said housing and transfer means moveable between a retracted position and an extended position with respect to said surface and adapted to movably support the object;
   indexing means supported by said housing and moveable between a retracted position and an extended position with respect to said housing for indexing the object from one position to a predetermined second position;
   said transfer means operative to transfer the object from said surface to said indexing means and to transfer the object from said indexing means to said surface when said object has been indexed to said predetermined second position;
   means for rotating said surface to any position between a substantially horizontal position and a substantially vertical position; and
   said means for rotating said surface being disposed between said surface and said housing and including an elongated portion extending along an axis of said surface, said elongated portion rotatably supported about its longitudinal axis on said housing, said elongated portion including a driven gear disposed at one end thereof and a drive gear mounted on said housing operatively meshing with said driven gear to rotate said elongated portion so as to rotate said surface to any position between a substantially horizontal and substantially vertical position.

2. An assembly as set forth in claim 1 further characterized by said surface defining a plane and including two recessed portions disposed within said surface, said transfer means including two rods slideably disposed within said recess and parallel with the plane defined by said surface and moveable between retracted and extended positions with respect to said surface for movably supporting and operative to transfer the object from said indexing means to said surface and from said surface to said indexing means.

3. An assembly as set forth in claim 2 further characterized by said indexing means including at least one support arm slideably supported within said housing and moveable between a retracted position and an extended position with respect to said housing and jack means disposed at the distal end of said at least one support arm for indexing the object from one position to said predetermined second position.

4. An assembly as set forth in claim 3 further characterized by said jack means including a base support portion, a U-shaped collar and a hydraulic cylinder disposed between said base support portion and said collar, said hydraulic cylinder including a piston disposed therein with a rod moveable between a retracted position within said cylinder and an extended position out of said cylinder for moving said collar into engagement with the object to move the object from said one position to said predetermined second position.

5. An assembly as set forth in claim 4 further characterized by said assembly including surface locking means for locking the surface at any position between said substantially horizontal position and said substantially vertical position.

6. An assembly as set forth in claim 5 further characterized by said surface locking means including a downwardly extending flange disposed on one side of said surface; said flange including at least one aperture; said housing including a plurality of corresponding apertures disposed adjacent said flange; said surface locking means including a pin adapted to be disposed through said at least one aperture on said flange and through any one of the plurality of corresponding apertures on said housing to lock said surface in any one position between a substantially horizontal and substantially vertical position.

7. An assembly as set forth in claim 6 further characterized by said object being a film platter with a reel of film wound about a film ring disposed on a platter; said platter supported on a projection table; said projection table including at least one bottom leg and a vertical support extending upwardly from said leg; said table further including platter support arms extending horizontally outwardly from said vertical support for supporting said platter and a tensioning arm operatively connected to said platter support arm on the underside thereof for facilitating the delivery of film to a film projector and return therefrom to said film ring on said platter.

8. An assembly as set forth in claim 7 further characterized by said platter including a tit on the underside thereof for disposition in a corresponding depression on said platter support arm; said surface including means for receiving said tit when said platter is transferred to said surface.

9. An assembly as set forth in claim 8 further characterized by said means for receiving said tit including a slot disposed on said surface for receiving said tit when said platter is transferred to said surface.

10. An assembly as set forth in claim 9 further characterized by said U-shaped collar including a horizontal base portion and first and second arms upwardly extending from said base portion; said second arm including a recessed portion for receiving said tensioning arm when said collar is disposed for indexing said film platter from one position on said platter support arm to said predetermined second position.

11. An assembly as set forth in claim 10 further characterized by said housing moveably supported by wheels or the like and adapted for rolling engagement with a surface for facilitating the moving of a film platter from one projection table to another.

12. A film carriage assembly for supporting a film platter in a secured manner, said film carriage assembly comprising;
   a housing;
   a surface supported by said housing and adapted to support a film platter thereon;
   means for rotating said surface to any position between a substantially horizontal position and substantially vertical position;
   means for preventing movement of the film platter relative to said surface when said surface is rotated to any position between a substantially horizontal position and a substantially vertical position;
   transfer means moveable between a retracted position and an extended position with respect to said surface and adapted to movably support the film platter;
   indexing means supported by said housing and moveable between a retracted position and an extended position with respect to said housing for indexing the film platter from one position to a predetermined second position;
   said transfer means operative to transfer the film platter from said surface to said indexing means and to transfer the film platter from said indexing means to said surface when said film platter has been indexed to said predetermined position; and
   said means for rotating said surface being disposed between said surface and said housing and including an elongated portion extending along an axis of said surface, said elongated portion rotatably supported about its longitudinal axis on said housing, said elongated portion including a driven gear disposed at one end thereof and a drive gear mounted in said housing operatively meshing with said driven gear to rotate said elongated portion so as to rotate said surface to any position between a substantially horizontal and substantially vertical position.

13. An assembly as set forth in claim 12 further characterized by said surface defining a plane and including two recessed portions disposed within said surface, said transfer means including two rods slideably disposed within said recess and parallel with said plane defined by said surface and moveable between retracted and extended positions with respect to said surface for movably supporting and transferring the film platter from said indexing means to said surface and from said surface to said indexing means.

14. An assembly as set forth in claim 13 further characterized by said indexing means including at least one support arm slideably supported within said housing and moveable between a retracted position and an extended position with respect to said housing and jack means disposed at the distal end of said at least one support arm for indexing the film platter from one position to said predetermined second position.

15. An assembly as set forth in claim 14 further characterized by said jack means including a base support portion, a U-shaped collar and a hydraulic cylinder disposed between said base support portion and said collar, said hydraulic cylinder including a piston disposed therein with a rod moveable between a retracted position within said cylinder and an extended position out of said cylinder for moving said collar into engagement with the film platter to move the object from said one position to said predetermined second position.

16. An assembly as set forth in claim 15 further characterized by said assembly including surface locking means for locking the surface at any position between said substantially horizontal position and said substantially vertical position.

17. An assembly as set forth in claim 16 further characterized by said surface locking means including a downwardly extending flange disposed on one side of said surface; said flange including at least one aperture; said housing including a plurality of corresponding apertures disposed adjacent said flange; said surface locking means including a pin adapted to be disposed through said at least one aperture on said flange and through any one of the plurality of corresponding apertures on said housing to lock said surface in any one position between a substantially horizontal and substantially vertical position.

18. An assembly as set forth in claim 17 further characterized by said film platter including a reel of film including a film ring disposed on said platter; said platter supported on a projection table; said projection table including at least one bottom leg and a vertical support extending upwardly from said leg; said leg further including platter support arms extending horizontally outwardly from said vertical support for supporting said platter and a tensioning arm operatively connected to said platter support arm on the underside thereof for facilitating the delivery of film to a film projector and a return therefrom to said film ring on said platter.

19. An assembly as set forth in claim 17 further characterized by said platter including a tit on the underside thereof for disposition in a corresponding depression on said platter support arm; said surface including means for receiving said tit when said platter is transferred to said surface.

20. An assembly as set forth in claim 19 further characterized by said means for receiving said tit including a slot disposed on said surface for receiving said tit when said platter is transferred to said surface.

21. An assembly as set forth in claim 20 further characterized by said U-shaped collar including a horizontal base portion and first and second arms upwardly extending from said base portion; said second arm including a recessed portion for receiving said tensioning arm when said collar is disposed for indexing said film platter from one position on said platter support arm to a predetermined second position.

22. An assembly as set forth in claim 21 further characterized by said housing moveably supported by wheels for rolling engagement with a surface for facilitating the moving of a film platter on said film carriage assembly from one projection table to another.

23. A method of transferring a film platter from a projection table to a film carriage assembly in a secured manner including the steps of:
  indexing the film platter with an indexing means from a position on the projection table to a predetermined second position raised from the projection table;
  transferring the film platter from the indexing means to a transfer means;
  transferring the film platter from the transfer means to a surface on the film carriage assembly;
  locking the platter against movement on the surface of the film carriage assembly; and
  rotating the surface of the film carriage assembly to any position between a substantially horizontal and a substantially vertical position.

24. A method as set forth in claim 23 wherein said step of indexing the film is further characterized by moving the indexing means to a extended position away from the film carriage assembly and beneath the film platter disposed on the projection table;
  raising a collar on the indexing means upwardly into engagement with the platter to index the platter for one position on the projection table to said predetermined second position.

25. A method as set forth in claim 24 wherein said step of transferring the film platter from the indexing means to the transfer means is further characterized by moving the transfer means to an extending position away from the surface of the film carriage assembly and beneath the film platter disposed at said predetermined second position and lowering the collar on the indexing means to place the platter on the platter transfer means.

26. A method as set forth in claim 25 wherein the step of transferring the film platter from the transfer means to the surface of the carriage assembly is further characterized by moving the transfer means from the extend position to a retracted position in the recessed portions of the surface and parallel to the planed defined by the surface so that the platter is supported by the surface on the film carriage assembly.

* * * * *